(12) United States Patent  
Kikuchi

(10) Patent No.: US 6,683,656 B1
(45) Date of Patent: Jan. 27, 2004

(54) VIDEO INTERMEDIATE FREQUENCY PROCESSING APPARATUS

(75) Inventor: Kazuyuki Kikuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,178

(22) Filed: Apr. 13, 2000

(30) Foreign Application Priority Data

Dec. 16, 1999 (JP) ............................................ 11-357974

(51) Int. Cl.[7] ................................................ H04N 5/46
(52) U.S. Cl. ...................... 348/729; 348/737; 348/725; 455/188.1
(58) Field of Search ................................ 348/729, 736, 348/737, 738, 731, 725; 455/179.1, 180.1, 180.4, 188.1, 188.2, 189.2; H04N 5/44, 5/455, 5/46

(56) References Cited

U.S. PATENT DOCUMENTS

| | | | |
|---|---|---|---|
| 5,710,993 A | | 1/1998 | Brekelmans |
| 6,044,251 A | * | 3/2000 | Brekelmans ............. 345/189.1 |
| 6,211,925 B1 | * | 4/2001 | Kikuchi ...................... 348/729 |
| 6,351,294 B1 | * | 2/2002 | Yamamoto et al. ......... 348/731 |
| 6,353,462 B1 | * | 3/2002 | Osada et al. ................ 348/729 |
| 6,483,552 B1 | * | 11/2002 | Yamamoto ................. 348/729 |

FOREIGN PATENT DOCUMENTS

| | | | |
|---|---|---|---|
| JP | 62-38046 | 2/1987 | |
| JP | 7-162771 | 6/1995 | |
| JP | 07-162771 | * 6/1995 | ............ H04N/5/44 |
| JP | 10-136287 | 5/1998 | |

* cited by examiner

Primary Examiner—Michael H. Lee
Assistant Examiner—Trang U. Tran
(74) Attorney, Agent, or Firm—Leydig, Voit & Mayer, Ltd.

(57) ABSTRACT

In an image intermediate-frequency processing apparatus, in addition to a first phase locked loop (PLL) for receiving a television broadcast, there is provided a second PLL including a voltage controlled oscillator (VCO), two frequency-dividing units, a reference signal generating unit, a phase-comparing unit, and a filter. When receiving FM broadcast, a stable oscillation output obtained from the VCO is input into an audio intermediate frequency detector, to obtain an audio signal of high quality.

6 Claims, 3 Drawing Sheets

VIDEO INTERMEDIATE FREQUENCY PROCESSING APPARATUS

FIELD OF THE INVENTION

The present invention relates to an image intermediate-frequency processing apparatus which makes it possible to receive an FM broadcast in a television or a VTR.

BACKGROUND OF THE INVENTION

In recent years, portable televisions such as liquid crystal televisions, color televisions attached with VTRs or the like have become very popular. There have also come in the market television receivers capable of receiving ordinary FM broadcast as well as television broadcast. FIG. 3 is a block diagram that shows a schematic configuration of a prior-art image intermediate-frequency processing apparatus that is built into such a television receiver.

The image intermediate-frequency processing apparatus shown in FIG. 3 can broadly be divided into three sections, i.e. a tuner section, an intermediate-frequency filtering section and an image intermediate-frequency processing section. As shown in FIG. 3, the tuner section is structured by an antenna 1 that receives broadcasting waves, and a tuner 2 that selects a desired broadcasting wave from the waves received by the antenna 1. The tuner 2 also converts the selected television broadcasting signal into an intermediate frequency signal including an image i.e., video modulation component and a voice i.e., audio modulation component when receiving a television broadcast. Further, in order to make it possible to receive FM broadcast as well a television broadcast, during reception of FM broadcast, the tuner 2 converts the selected FM broadcasting signal into intermediate-frequency signal of the same frequency as that of a voice intermediate-frequency component received during the reception of a television broadcast. The tuner 2 then outputs this converted intermediate-frequency signal.

The intermediate-frequency filtering section includes an image intermediate-frequency SAW filter 3 (hereinafter to be referred to as VIF-SAW filter) which extracts an image intermediate-frequency signal of 58.75 MHz (in the case of Japan) from the output of the tuner 2, and a voice intermediate-frequency SAW filter 4 (hereinafter to be referred to as SIF-SAW filter) which extracts a voice intermediate-frequency signal of 54.25 MHz (in the case of Japan) from the output of the tuner 2.

The image intermediate-frequency processing section can be further divided into an image signal processing section and a voice signal processing section. The image signal processing section includes a VIF amplifier 5 (hereinafter to be referred to as VIF-AMP) which amplifies the output of the VIF-SAW filter 3, an image detector 6 which detects the output of the VIF-AMP 5, an IF automatic gain control circuit 7 (hereinafter to be referred to as IF-AGC circuit) which controls the gain in the VIF-AMP 5 according to the output of the image detector 6, an IF-AGC filter 8 made up of a capacitor, an automatic phase detector 11 (hereinafter to be referred to as APC detector) which compares phase of the output signal of the VIF-AMP 5 with phase of an output signal of a voltage control oscillator (hereinafter to be referred to as VCO) 12, outputs a signal that represents a phase difference between these two phases to the VCO 12, and carries out automatic phase control to the VCO 12, and an APC filter 14.

The APC filter 14 is generally structured by a capacitor and a resistor. An IF-AGC filter terminal 9 is a terminal that connects the IF-AGC filter 8 to an output of the IF-AGC circuit 7. An APC filter terminal 13 is a terminal that connects the APC filter 14 to an output of the APC detector 11.

The voice signal processing section is structured by an SIF detector 16 that receives the outputs of the SIF-SAW filter 4 and VCO 12, carries out SIF detection and obtains a signal of 4.5 MHz that is an inter-carrier, and an FM detector 17 (hereafter to be refereed to as FM-DET) which FM-detects the output of the SIF detector 16 and converts the detected wave into a voice signal. The voice signal is output from a voice signal output terminal 18.

Further, there are provided a switch 10 that is changed over to a TV terminal side so as to open both sides of the IF-AGC filter 8 at the time of receiving a television broadcast and that is changed over to an FM terminal side so as to short-circuit both sides of the IF-AGC filter 8 at the time of receiving an FM broadcast, and a switch 15 that is changed over to the TV terminal side so as to supply the output of the APC detector 11 to the VCO 12 at the time of receiving a television broadcast and that is changed over to the FM terminal side so as to oscillate the VCO 12 in the free running oscillation frequency at the time of receiving an FM broadcast. Further, for the image intermediate-frequency processing apparatus to function as a color television receiver, although not shown here, there are provided a color signal processing section and a luminance signal processing section, etc., in addition to the above-described structure, in the image intermediate-frequency processing section.

The operation of the prior-art image intermediate-frequency processing apparatus will be explained next. The case of receiving a television broadcast is explained first. In this case the switch 10 and the switch 15 are changed over to the TV terminal side. When the antenna 1 receives a signal sent from a broadcasting station, the received broadcasting signal is mixed with a local oscillation output corresponding to a desired channel selected by the tuner 2, and is input into the filtering section (VIF-SAW 3 and IF-SAW 4).

The VIF-SAW 3 takes out only the image intermediate-frequency signal from the signal obtained from the tuner 2, and inputs this image intermediate-frequency signal into the VIF-AMP 5 at the next stage. The VIF-AMP 5 amplifies the image intermediate-frequency signal obtained from the VIF-SAW 3 to a constant level. The image intermediate-frequency signal output from the VIF-SAW 3 is detected and demodulated by the image detector 6. The demodulated image signal is output from an image signal output terminal 19. In this case, as the switch 10 is in the status of not short-circuiting either end of the IF-AGC filter 8, the IF-AGC circuit 7 can input into the VIF-AMP 5 an AGC voltage generated based on the image-detected output of the image detector 6.

The AGC voltage obtained from the IF-AGC circuit 7 is smoothed by the IF-AGC filter 8. The smoothed AGC voltage is input into the VIF-AMP 5. As explained above, when receiving a television broadcast, a negative feedback loop is formed by the VIF-AMP 5, the image detector 6, the IF-AGC circuit 7, and the IF-AGC filter 8.

A reference carrier to be input into the image detector 6 for detecting an image is generated by a phase-locked loop (hereinafter to be referred to as a PLL) formed by the APC detector 11, the APC filter 14 and the VCO 12 that are closed by the switch 15. In other words, a reference carrier of which phase is aligned with the phase of the carrier of the VIF signal by the VCO 12, is input into the image detector 6.

Thus, when receiving a television broadcast, the VIF-AMP 5 can maintain the amplification operation at a constant level, by changing over the switch 10 and the switch 15 to the TV terminal side respectively. Resultantly, it is possible to obtain a desired image signal corresponding to a selected channel, from the image signal output terminal 19.

Regarding a voice signal of the television broadcast, at first, the SIF-SAW 4 takes out only the voice intermediate-frequency signal (54.25 MHz in the case of Japan) from the signal obtained by the tuner 2. This voice intermediate-frequency signal is then input into the SIF detector 16. The SIF detector 16 multiplies the voice intermediate-frequency signal obtained from the SIF-SAW filter 4 by a reference carrier obtained from the VCO 12, thereby to carry out the wave detection. Further, this voice intermediate-frequency signal is converted into the FM signal of which carrier frequency is 4.5 MHz. The FM signal obtained from the SIF detector 16 is input to the FM detector 17. The FM detector 17 demodulates a voice signal from this FM signal, and outputs the voice signal to the signal output terminal 18. Thus, it is possible to obtain a desired voice signal corresponding to a selected channel.

On the other hand, when receiving FM broadcast, switches 10 and 15 are changed over to the FM terminal side. Thus, both ends of the IF-AGC filter 8 are short-circuited, and the gain in the VIF-AMP 5 is set to a minimum. When the gain of the VIF-AMP 5 is minimum, no signal is output to the APC detector 11. Further, as the switch 15 has been changed over to the FM terminal side, the VCO 12 oscillates in the free running oscillation frequency without receiving an influence of the APC detector 11. The FM broadcasting signal obtained from the tuner 2 is input into the SIF-SAW 4. The SIF-SAW 4 takes out only the voice intermediate-frequency signal of 54.25 MHz from this FM broadcasting signal.

The voice intermediate-frequency signal output from the SIF-SAW filter 4 is input into the SIF detector 16 for detecting the signal. In this case, the SIF detector 16 multiplies the oscillation output that is in free running oscillation in the VCO 12 by the input voice intermediate-frequency, so that an FM signal of which carrier frequency is 4.5 MHz is obtained. The FM signal obtained from the SIF detector 16 is input into the FM detector 17 in a similar manner to that of the above-described case of receiving a television broadcast. The FM detector 17 demodulates a voice signal from the FM signal and outputs the voice signal to the voice signal output terminal 18. Thus, it is possible to obtain a desired voice signal corresponding to the selected channel.

However, the prior-art image intermediate-frequency processing apparatus capable of receiving an FM signal has the following problem. As the apparatus uses a free running oscillation frequency of the VCO 12 in the FM wave detection when receiving FM broadcast, the FM wave detection is directly affected by a variance in the manufacturing of the VCO 12 or a variation in the temperature-dependent characteristics of the VCO 12.

The SIF detector 16 multiplies the output of the free running oscillation VCO 12 by the voice intermediate-frequency signal for obtaining a carrier frequency. Therefore, the carrier frequency shall deviate from the desired frequency (4.5 MHz) if there is a variance in the free running oscillation frequency of the VCO 12. As a result, there is a problem that the quality of the voice signal is deteriorated when receiving FM broadcast.

SUMMARY OF THE INVENTION

It is an object of the present invention to provide an image intermediate-frequency processing apparatus capable of receiving FM broadcast that can stabilize the free running oscillation frequency of a VCO with non-adjustment during the reception of FM broadcast and that can make the quality of the sound signal during the reception of FM broadcast equal to the sound quality during the reception of television broadcast.

In order to achieve the above object, according to one aspect of the present invention, in the image intermediate-frequency processing apparatus, a phase-locked loop, i.e. a second phase-locked loop is exclusively provided which performs intermediate-frequency processing of FM broadcasting signal.

Further, the second phase-locked loop has a second voltage control oscillating unit which oscillates according to an input of a second control voltage, a first frequency-dividing unit which divides the frequency of the output of the second voltage control oscillating unit, a reference signal generating unit which generates a reference signal, a second frequency-dividing unit which divides the frequency of the reference signal, a second phase-comparing unit which compares a phase of the output of the first frequency-diving unit with a phase of the output of the second frequency-dividing unit, and inputs a result of the comparison to the second voltage control oscillating unit as the second control voltage, and a second filter which smoothes the second control voltage. Thus, this phase-locked loop can perform FM wave detection.

Further, the switching unit inputs an oscillation output of the first voltage control oscillating unit into the voice intermediate-frequency detecting unit at the time of receiving a television broadcast, and inputs an oscillation output of the second voltage control oscillating unit into the voice intermediate-frequency detecting unit at the time of receiving an FM broadcast. Therefore, it is possible to discriminate the use of oscillation signals to be input into the voice intermediate-frequency detecting unit between the time of receiving a television broadcast and the time of receiving an FM broadcast.

Further, a result of the comparison by the second phase-comparing unit is also input into the first voltage control oscillating unit. Therefore, it is possible to carry out a stable oscillation by absorbing a variance in the free running oscillation frequency of the first voltage control oscillating unit due to the manufacturing or the temperature-dependent characteristics of the first voltage-control oscillating unit, regardless of the time of receiving a television broadcast or the time of receiving an FM broadcast.

Further, the switching unit inputs an oscillation output of the first voltage control oscillating unit into the first frequency-dividing unit without inputting the oscillation output of the second voltage control oscillating unit into the first frequency-dividing unit when receiving FM broadcast. Further, a result of the comparison by the second phase-comparing unit is input into the first voltage control oscillating unit. Therefore, it is possible to discriminate the use of oscillation signals to be input into the voice intermediate-frequency detecting unit between the time of receiving a television broadcast and the time of receiving an FM broadcast.

Further, the frequency dividing ratios in the first frequency-dividing unit and the second frequency-dividing unit can changed based on a program. Therefore, it is also possible to correspond to a plurality of different image intermediate-frequency signals.

Other objects and features of this invention will become apparent from the following description with reference to the accompanying drawings.

DESCRIPTION OF THE PREFERRED EMBODIMENTS

An embodiment of an image intermediate-frequency processing apparatus according to the present invention will be explained in detail below with reference to the drawings. It should be noted that the present invention is not limited by this embodiment.

Figure 1:
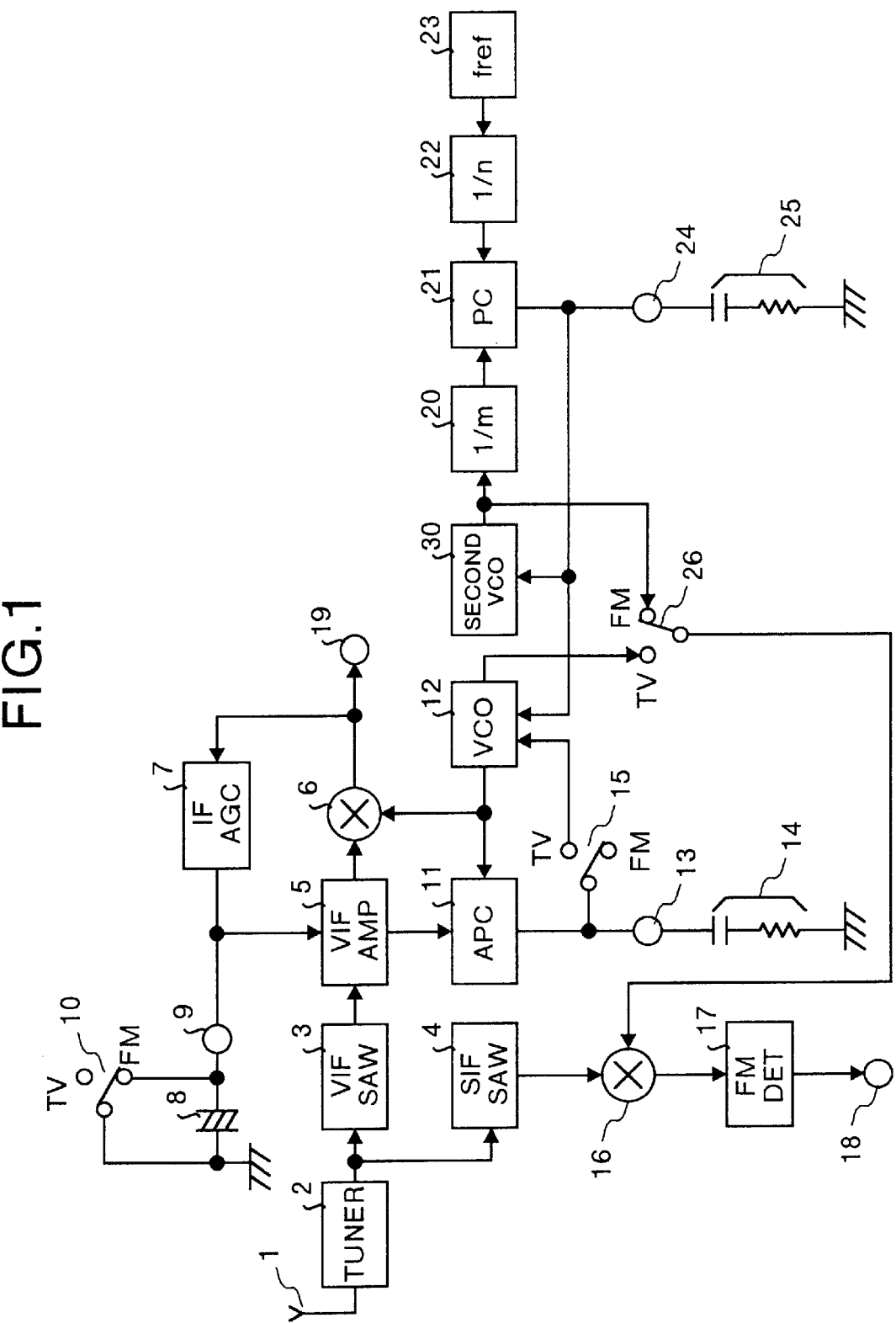
FIG. 1 is a block diagram that shows a schematic configuration of an image intermediate-frequency processing apparatus according to a first embodiment of the present invention.

At first, an image intermediate-frequency processing apparatus relating to the first embodiment will be explained. FIG. 1 is a block diagram that shows a schematic configuration of the image intermediate-frequency processing apparatus according to the first embodiment. In FIG. 1, portions that are common to portions in FIG. 3 have the same reference numbers, and their explanation will be omitted.

The image intermediate-frequency processing apparatus according to the first embodiment includes a new PLL (hereinafter to be referred to as a second PLL) different from a PLL (hereinafter to be referred to as a first PLL) operating during reception of television broadcast, the signal generated and output by this second PLL is used for detecting an FM wave during reception of FM broadcast.

Figure 3:
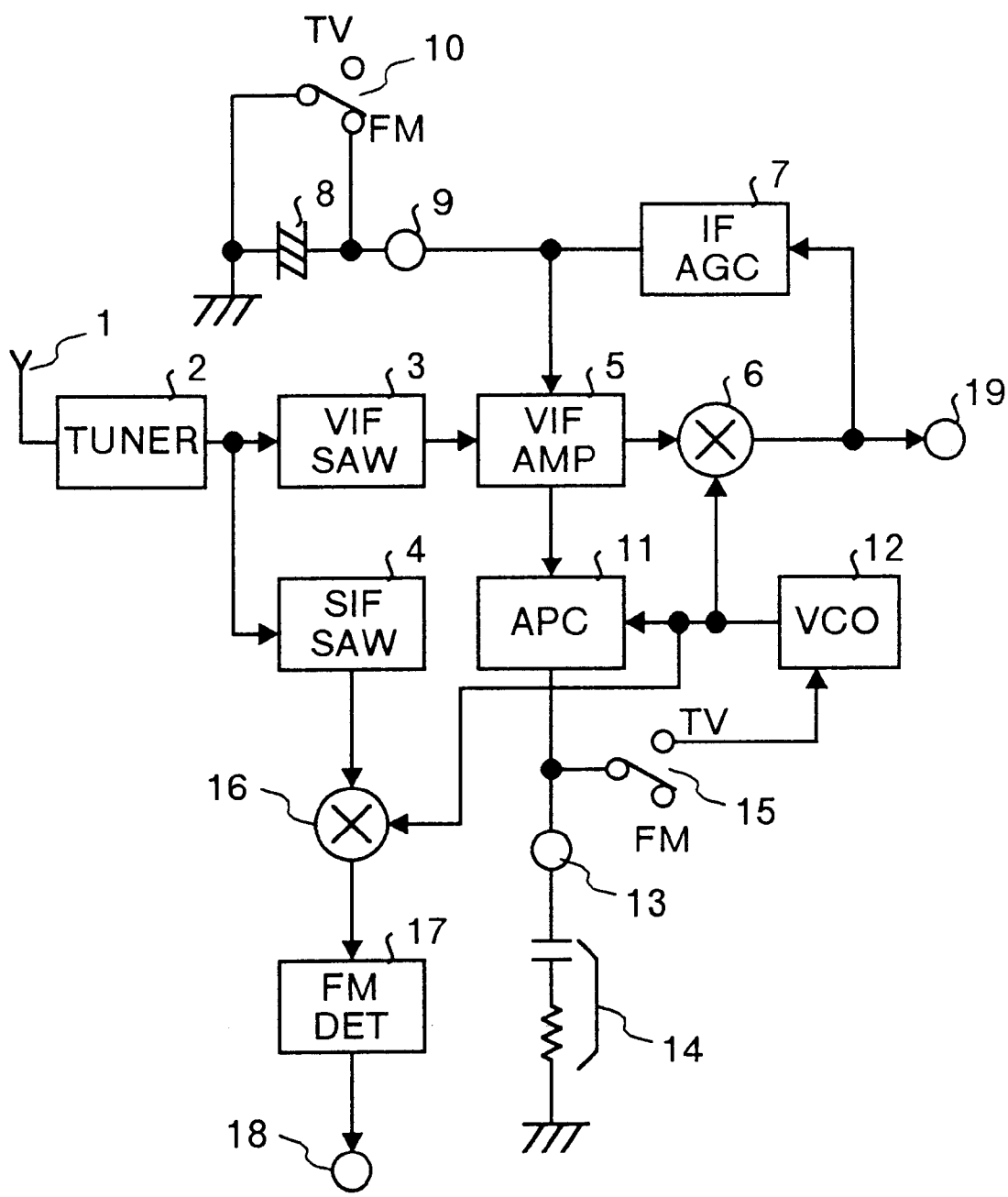
FIG. 3 is a block diagram that shows a schematic configuration of a prior-art image intermediate-frequency processing apparatus.

The image intermediate-frequency processing apparatus shown in FIG. 1 includes, in addition to the structure of the prior-art image intermediate-frequency processing apparatus shown in FIG. 3, a second VCO 30 includes circuits similar to those of the VCO 12, first frequency-dividing unit (1/m) 20 for dividing the frequency of the output of the VCO 12, reference signal generating unit (fref) 23, second frequency-dividing unit (1/n) 22 for dividing the frequency of the output of the reference signal generating unit 23, a phase comparator (PC) 21 which compares the phase of the signal output from the first frequency-dividing unit 20 with the phase of the signal output from the second frequency-dividing unit 22 and outputs an error voltage, and a filter 25. The reference signal generating unit 23 supplies a signal in a status that a stable frequency (the frequency is generally 4 MHz) is generated by a local oscillator inside the tuner 2, for example. The filter 25 includes a resistor and a capacitor. The output of the phase comparator 21 is supplied to this filter 25 through a filter terminal 24, so that this output is smoothed.

The smoothed error voltage signal of the phase comparator 21 is negatively fed back to the second VCO 30, so that a second PLL loop is formed. The error voltage signal of the phase comparator 21 is also supplied to the VCO 12.

Further, in the image intermediate-frequency processing apparatus according to the first embodiment, there is also provided a switch 26 for selecting between a oscillation output generated by the second VCO 30 and an oscillation output generated by the prior-art VCO 12 and for inputting the selected oscillation outputs to the SIF detector 16. In other words, when receiving television broadcast, the switch 26 is selected the TV terminal side so as to supply the output of the VCO 12 to the SIF detector 16. On the other hand, when receiving FM broadcast, the switch 26 is changed over to the FM terminal side so as to supply the output of the second VCO 30 to the SIF detector 16.

The operation of the image intermediate-frequency processing apparatus will be explained below with an emphasis on the second PLL loop. The first frequency-dividing unit 20 divides the frequency of the output of the second VCO 30 into a suitable frequency, such as, 1/m, for example, and then inputs this frequency-divided output signal to the phase comparator 21. On the other hand, the reference signal generating unit 23 inputs a frequency-stabilized signal into the second frequency-dividing unit 22. The second frequency-dividing unit 22 divides the frequency of the input signal into a suitable frequency, such as, 1/n, for example, and then inputs this frequency-divided input signal into the phase comparator 21.

The phase comparator 21 compares the phase of the output signal of the first frequency-dividing unit 20 with the phase of the output signal of the second frequency-dividing unit 22. A result of the phases compared by the phase comparator 21, that is, an error component signal, is input into the filter 25 through the filter terminal 24. The error component signal is smoothed in the filter 25. The smoothed error component signal is fed back to the second VCO 30 and also to the VCO 12.

As explained above, the second PLL includes the second VCO 30, the first frequency-dividing unit 20, the phase comparator 21, the second frequency-dividing unit 22, the reference signal generating unit 23 and the filter 25. Therefore, it is possible with this second PLL to obtain always a stable oscillation output without a variation due to the manufacturing or without temperature-dependent characteristics, regardless of whether television broadcast is received or FM broadcast is received. Accordingly, when the switch 26 selects the FM terminal side so as to input the oscillation output of the second VCO 30 into the SIF detector 16 when receiving FM broadcast, it is possible to obtain a satisfactory voice signal similar to the voice signal obtained when a television broadcast is received.

On the other hand, when receiving a television broadcast, the switch 26 selects the TV terminal side, so that the output signal of the VCO 12 is input into the SIF detector 16. Thus, the operation becomes similar to that as described in the prior-art example. Further, as the error component signal generated by the phase comparator 21 has been input into the VCO 12, the VCO 12 can carry out a stable oscillation by absorbing a variation in the free running oscillation frequency due to the manufacturing and temperature-dependent characteristics. Accordingly, it is possible to decrease the lock time of the first PLL when, for example, reception is changed from FM broadcast to television broadcast.

It is needless to mention that, in the above-described second PLL, the image intermediate-frequency processing apparatus of the present embodiment can be easily applied to a plurality of image intermediate-frequency signals (for example, 58.75 MHz in the case of Japan, and 45.75 MHz in the case of the USA) by suitably changing over the frequency dividing ratios of the first frequency-dividing unit 20 and the second frequency-dividing unit 22 in a programmable manner by operating unit not shown in the figure.

Further, when the apparatus is to function as a color television receiver, it is possible to utilize a crystal oscillator (which outputs, for example, the oscillation frequency of 3.57954 MHz: NTSC) for processing a color signal as the reference signal generating unit 23.

As explained above, the image intermediate-frequency processing apparatus according to the first embodiment, the apparatus includes, in addition to the structure of the prior-art image intermediate-frequency processing apparatus, the second PLL. This second PLL includes the second VCO 30 circuits similar to those of the VCO 12, the first frequency-dividing unit 20 for dividing the frequency of an output of the VCO 12, the reference signal generating unit 23, the second frequency-dividing unit 22 for dividing the frequency of an output of the reference signal generating unit 23, the phase comparator 21 for comparing an output phase of the first frequency-dividing unit 20 with an output phase of the second frequency-dividing unit 22 and for outputting an error voltage, and the filter 25. When receiving FM broadcast, the apparatus carries out a detection of an FM wave by using the oscillation output generated by the second PLL. Therefore, it is possible to make the quality of the voice signal during the reception of the FM broadcast equal to the voice quality during the reception of a television broadcast.

Further, the error component signal output from the phase comparator 21 in the second PLL is also input into the VCO 12 in the first PLL. Therefore, it is possible to decrease the lock time of the first PLL when, for example, the reception is changed from FM broadcast to television broadcast. Thus, it is possible to carry out a smooth change-over between the reception of television broadcast and the reception of FM broadcast.

Figure 2:
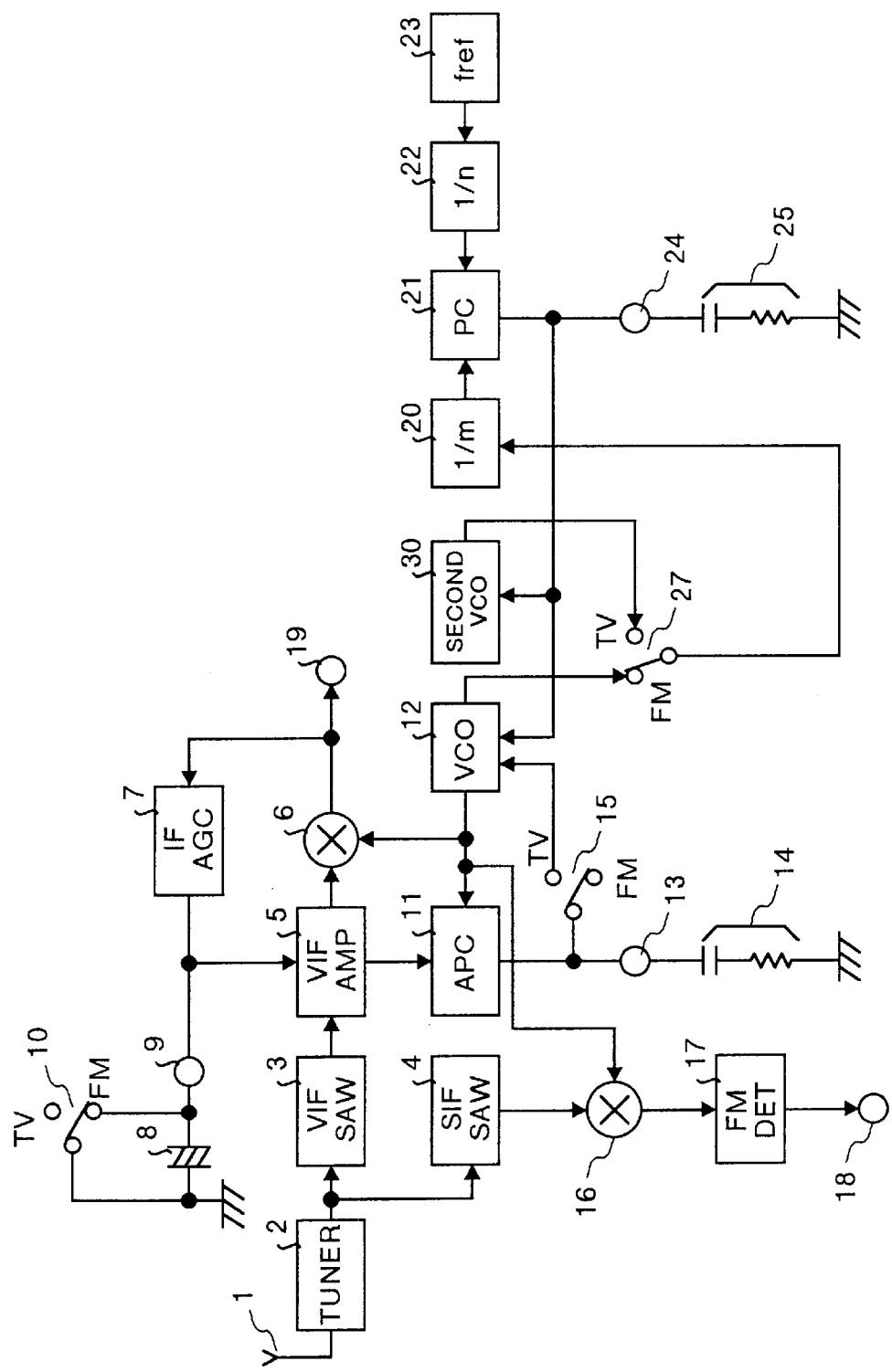
FIG. 2 is a block diagram that shows a schematic configuration of an image intermediate-frequency processing apparatus according to a second embodiment of the present invention.

The image intermediate-frequency processing apparatus according to the second embodiment will be explained below. FIG. 2 is a block diagram that shows a schematic configuration of the image intermediate-frequency processing apparatus according to the second embodiment. In FIG. 2, portions that are common to portions in FIG. 1 are attached with the same reference numbers, and their explanation will be omitted.

The image intermediate-frequency processing apparatus according to the second embodiment is characterized in that, in addition to the first PLL for operating during a reception of television broadcast, there is provided a second PLL different from the first PLL, and that during the reception of FM broadcast, a VCO in the first PLL obtains an oscillation output based on an error component signal of a phase comparator in the second PLL.

The image intermediate-frequency processing apparatus shown in FIG. 2 includes the same structural elements as those of the image intermediate-frequency processing apparatus of the first embodiment. However, the placement of the structural elements in the second embodiment is different from that in the first embodiment. More specifically, as shown in FIG. 2, reception can be changed between television broadcast and FM broadcast using the switch 27. When receiving the television broadcast the output of the second VCO structured by circuits similar to those of the VCO 12 is input into the first frequency-dividing unit 20. Thus, a PLL is formed by the phase comparator 21, the second frequency-dividing unit 22 and the reference signal generating unit 23.

On the other hand, when receiving FM broadcast, the output of the VCO 12 is input into the first frequency-dividing unit 20. Thus, a PLL is formed by the phase comparator 21, the second frequency-dividing unit 22 and the reference signal generating unit 23. In other words, the second embodiment is different from the first embodiment in that, both during the reception of television broadcast and during the reception of FM broadcast, a voice signal is obtained by inputting an oscillation output obtained from the VCO 12 into the SIF detector 16.

The operation of this image intermediate-frequency processing apparatus will be explained below. When receiving FM broadcast, the switch 27 is changed over to the FM terminal side. Thus, the frequency of an output of the VCO 12 is divided into a suitable frequency, 1/m, for example, by the first frequency-diving unit 20. Then, the frequency-divided output is input into the phase comparator 21. The reference signal generating unit 23 inputs the frequency-stabilized signal to the second frequency-dividing unit 22.

The second frequency-dividing unit 22 divides the frequency of the input signal into a suitable frequency, 1/n, for example, and then inputs the frequency-divided signal into the phase comparator 21. The phase comparator 21 compares the phase of the output signal of the first frequency-dividing unit 20 with the phase of the output signal of the second frequency-dividing unit 22. A result of the phases compared by the phase comparator 21, that is, an error component signal, is input into the filter 25 through the filter terminal 24. The filter 25 smoothes this error component signal. The smoothed error component signal is fed back to the VCO 12 and also to the second VCO 30.

As explained above, it is possible to always obtain a stable oscillation output without a variation due to the manufacturing or without temperature-dependent characteristics because of the provision of the PLL that is structured by the VCO 12, the first frequency-dividing unit 20, the phase comparator 21, the second frequency-dividing unit 22, the reference signal generating unit 23, and the filter 25. Accordingly, in this status, it is also possible to obtain a satisfactory voice signal during a reception of an FM broadcast, by inputting the oscillation output of the VCO 12 to the SIF detector 16.

On the other hand, in the case of receiving a television broadcast, the switch 27 is changed over to the TV terminal side. Thus, the VCO 12 is separated from the structure formed by the first frequency-dividing unit 20, the phase comparator 21, the second frequency-dividing unit 22, the reference signal generating unit 23, and the filter 25. As a result, it is possible to carry out an operation similar to that of the prior-art method when receiving television broadcast.

However, in this case, the second VCO 30 forms a PLL together with the first frequency-dividing unit 20, the phase comparator 21, the second frequency-dividing unit 22, the reference signal generating unit 23, and the filter 25. Further, the error component signal obtained from the phase comparator 21 in the PLL is input into the VCO 12. Accordingly, it is possible to decrease the lock time of the PLL by the VCO 12 when, for example, the reception is changed from television broadcast to FM broadcast.

In a manner similar to that of the first embodiment, the image intermediate-frequency processing apparatus of the present embodiment can be easily applied to a plurality of image intermediate-frequency signals by suitably changing over the frequency dividing ratios of the first frequency-dividing unit 20 and the second frequency-dividing unit 22 in a programmable manner using an operating unit not shown in the figure. Further, when the apparatus is to function as a color television receiver, it is possible to utilize a crystal oscillator for processing a color signal as the reference signal generating unit 23.

As explained above, according to the image intermediate-frequency processing apparatus relating to the second embodiment, the apparatus includes the second VCO 30 in addition to the structure of the prior-art image intermediate-frequency processing apparatus formed by the circuits similar to those of the VCO 12, the first frequency-dividing unit 20 for dividing the frequency of an output of the VCO 12, the reference signal generating unit 23, the second frequency-dividing unit 22 for dividing the frequency of the output of the reference signal generating unit 23, the phase comparator 21 for comparing the output phase of the first frequency-dividing unit 20 with the output phase of the second frequency-dividing unit 22 and for outputting an error voltage, and the filter 25. When receiving FM broadcast, the VCO 12 forms the PLL together with the first frequency-dividing unit 20, the phase comparator 21, the second frequency-dividing unit 22 and the reference signal generating unit 23. With this arrangement, oscillation output is obtained based on the error component signal of the phase comparator 21, and FM wave detection is carried out by using the oscillation output generated by the VCO 12. Therefore, it is possible to make the quality of the voice signal during the reception of FM broadcasting signal equal to the voice quality during the reception of television broadcast.

Further, when receiving television broadcast, the error component signal output from the phase comparator 21 is input into the VCO 12. Therefore, it is possible to decrease the lock time of the PLL by the VCO 12 when the reception is changed from television broadcast to FM broadcast. As a result, it is possible to carry out a smooth change-over between the reception of television broadcast and FM broadcast.

As explained above, according to one aspect of the present invention, there is provided the second phase-locked loop for exclusively carrying out an intermediate-frequency processing of FM broadcasting signal. Therefore, it is possible to carry out an FM wave detection by inputting a non-adjusted stable oscillation output obtained by the second phase-locked loop to the voice intermediate-frequency detecting unit. Thus, there is obtained an effect that it is possible to increase the quality of the reception of FM broadcast.

Further, in addition to the above-described first phase-locked loop, there is provided the second phase-locked loop structured by the second voltage control oscillating unit, the first frequency-dividing unit, the reference signal generating unit, the second frequency-dividing unit, the second phase-comparing unit and the second filter. Therefore, it is possible to carry out an FM wave detection by inputting a stable oscillation output obtained by the second voltage control oscillating unit to the voice intermediate-frequency detecting unit. Thus, there is obtained an effect that it is possible to increase the quality of a voice signal during a reception of FM broadcast to the same quality level as that of a voice quality during a reception of television broadcast.

Further, during reception of television broadcast, the oscillation output of the first voltage control oscillating unit is input into the voice intermediate-frequency detecting unit, by the switching unit. During reception of FM broadcast, the oscillation output of the second voltage control oscillating unit is input into the voice intermediate-frequency detecting unit, by the switching unit. Therefore, it is possible to discriminate the use of oscillation signals to be input into the voice intermediate-frequency detecting unit between when receiving television broadcast and when receiving FM broadcast. Thus, there is obtained an effect that it is possible to obtain a high-quality voice signal during both periods.

Further, result of the comparison by the second phase-comparing unit is also input into the first voltage control oscillating unit. Therefore, it is possible to carry out a stable oscillation by absorbing a variance in the free running oscillation frequency of the first voltage control oscillating unit due to the manufacturing or the temperature-dependent characteristics of the first voltage-control oscillating unit, regardless of whether the television broadcast is being received or the FM broadcast is being received. It is possible to decrease the lock time of the first phase-locked loop when, for example, reception is changed over from FM broadcast to television broadcast. Thus, there is obtained an effect that it is possible to carry out a smooth change-over between the reception of television broadcast and the reception of FM broadcast.

Further, when receiving FM broadcast, using the switching unit, the oscillation output of the first voltage control oscillating unit is input into the first frequency-dividing unit without inputting the oscillation output of the second voltage control oscillating unit to the first frequency-dividing unit. Further, a result of the comparison by the second phase-comparing unit is input into the first voltage control oscillating unit. Therefore, it is possible to discriminate the use of oscillation signals to be input into the voice intermediate-frequency detecting unit between when receiving television broadcast and when receiving FM broadcast. Thus, there is obtained an effect that it is possible to obtain a high-quality voice signal during both periods.

Further, according to the present invention, the first frequency-dividing unit and the second frequency-dividing unit can set their respective frequency dividing ratios in a programmable manner. Therefore, there is obtained an effect that it is possible to obtain a stable oscillation output in the case of detecting a plurality of different image intermediate-frequency signals.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A video intermediate-frequency processing apparatus for receiving FM broadcasts and television broadcasts, said apparatus comprising:

a tuning unit for a tuning to a broadcast signal and outputting an intermediate-frequency signal based on the broadcast signal tuned;

a video filtering unit for filtering a video intermediate-frequency (VIF) signal from the intermediate-frequency signal;

an audio filtering unit for filtering a sound intermediate-frequency (SIF) signal from the intermediate-frequency signal;

an SIF detecting unit receiving the SIF signal and producing an inner-carrier signal;

an FM detecting unit receiving the inner-carrier signal and outputting a voice signal;

a first phase-locked loop for intermediate-frequency processing with respect to television broadcasting signal, wherein said first phase-locked loop includes
a VIF amplifying unit which amplifies the VIF signal to produce an amplified VIF signal;
a video detecting unit which detects the amplified VIF signal and produces a detected video signal;
an IF automatic gain control unit which controls gain of said VIF amplifying unit according to the detected video signal;

a first voltage controlled oscillating unit which oscillates according to an input of a first control voltage to produce a first oscillation signal;

a first phase-comparing unit which compares phase of the amplified VIF signal with phase of the first oscillation signal to produce a first error signal, and supplies the first error signal to said first voltage controlled oscillating unit as the first control voltage; and a first filter for smoothing the first control voltage, and a second phase-locked loop which performs intermediate-frequency processing with respect to an FM broadcasting signal, wherein said second phase-locked loop includes a second voltage controlled oscillating unit which oscillates according to an input of a second control voltage to produce a second oscillation signal having a frequency;

a first frequency-dividing unit which divides the frequency of the second oscillation signal to produce a first frequency divided signal having a frequency;

a reference signal generating unit which generates a reference signal having a frequency;

a second frequency-dividing unit which divides the frequency of the reference signal to produce a second frequency divided signal;

a second phase-comparing unit which compares phase of the first frequency divided signal with phase of the second frequency divided signal to produce a second error signal, and supplies the second error signal to said second voltage controlled oscillating unit as the second control voltage; and a second filter which smoothes the second control voltage.

2. The video intermediate-frequency processing apparatus according to claim 1, further comprising a switch for switching the first oscillation signal to said VIF detecting unit when receiving a television broadcast, and switching the second oscillation signal to said VIF detecting unit when receiving an FM broadcast.

3. The video intermediate-frequency processing apparatus according to claim 1, wherein the second voltage control signal is also input to said first voltage controlled oscillating unit.

4. The video intermediate-frequency processing apparatus according to claim 1, further comprising a switch for disconnecting the second oscillation signal from said first frequency-dividing unit and supplying the first oscillation signal to said first frequency-dividing unit when receiving an FM broadcast, wherein the second error signal is input to said first voltage controlled oscillating unit.

5. The video intermediate-frequency processing apparatus according to claim 1, wherein said first frequency-dividing unit and said second frequency-dividing unit have changeable frequency dividing ratios.

6. The video intermediate-frequency processing apparatus according to claim 1, further comprising:

a first switch that closes and opens a signal path from said first phase-comparing unit to said first voltage controlled oscillating unit; and a second switch that closes and opens a signal path from said second voltage controlled oscillating unit to said SIF detecting unit, wherein said first switch and said second switch are controlled so that the signal path from said first phase-comparing unit to said first voltage controlled oscillating unit is closed when receiving a television broadcast, and the signal path from said first phase-comparing unit to said first voltage controlled oscillating unit is open and said second voltage controlled oscillating unit is connected to said SIF detecting unit to supply an output of said second voltage controlled oscillating unit to said FM detecting unit through said SIF detecting unit when receiving an FM broadcast.

\* \* \* \* \*